United States Patent [19]

Scholz et al.

[11] Patent Number: 5,196,504
[45] Date of Patent: Mar. 23, 1993

[54] REPULPABLE PRESSURE-SENSITIVE ADHESIVE COMPOSITIONS

[75] Inventors: William F. Scholz, Altadena; Robert H. Van Ham, Arcadia, both of Calif.

[73] Assignee: Avery Dennison Corporation, Pasadena, Calif.

[21] Appl. No.: 777,667

[22] Filed: Oct. 15, 1991

[51] Int. Cl.$^5$ .................. C08F 220/06; C08F 220/10; C08F 2/16

[52] U.S. Cl. ................................. 526/318.4; 524/460

[58] Field of Search ........................................ 526/318.3

[56] References Cited

U.S. PATENT DOCUMENTS

| | | | |
|---|---|---|---|
| 4,759,983 | 7/1988 | Knutson et al. | 428/343 |
| 5,049,416 | 9/1991 | Wilczynski | 427/208.4 |

*Primary Examiner*—Joseph L. Schofer
*Assistant Examiner*—Wu C. Cheng

*Attorney, Agent, or Firm*—Christie, Parker & Hale

[57] ABSTRACT

A water dispersible, inherently tacky pressure-sensitive adhesive comprising a tacky emulsion polymer formed of from about 80 to 90% by weight of monomers comprising a major portion of at least alkyl acrylate containing from 4 to about 8 carbon atoms in the alkyl group and from about 20 to 10% by weight of a mixture of acrylic acid with at least an oleophilic unsaturated carboxylic acid, said emulsion polymer formed in the presence of anionic and nonionic surfactants and a sufficient amount of chain transfer agent to provide a polymer having a glass transition temperature of $-15°$ to $-50°$ C. The emulsion polymers when coated on a repulpable paper substrate being sufficiently dispersible to enable recovery of paper fibers substantially free of adhesive under conditions of TAPPI Useful Method 213, and resistant to loss of adhesive properties on exposure to high humidity.

20 Claims, No Drawings

REPULPABLE PRESSURE-SENSITIVE ADHESIVE COMPOSITIONS

BACKGROUND OF THE INVENTION

The present invention relates to dispersible emulsion polymer systems which are functional as pressure-sensitive adhesives. The adhesives of the instant invention provide an ecologically friendly replacement for pressure sensitive adhesives which hinder clean paper recovery during repulping.

For a paper to be repulpable, the adhesive in a label or tape construction must be water (alkali) dispersible or water soluble and must pass TAPPI Useful Method 213 "Repulpability of Splice Adhesive Compositions," incorporated herein by reference. Most rubber-based and acrylic adhesive systems are not repulpable. During the repulping process (fiber shearing), the adhesives tend to agglomerate and form globules, commonly referred to in the trade as "stickies." Stickies adversely affect paper quality and have a negative impact on the process of recycling paper.

Several approaches can be taken to remove adhesive stickies. One has been to use water-dispersible adhesive microsphere technology prepared by processes described in U.S. Pat. Nos. 3,691,140 to Silver, 4,155,152 to Baker et al., 4,495,318 and 4,598,212 to Howard, and 4,810,763 to Mallya et al., each incorporated herein by reference, and applied at appropriately low coat-weights. While the adhesives disperse in the paper fiber adequately during the repulping process, the adhesive is not removed from the paper fiber. Rather, the adhesive microspheres accumulate in the paper fiber, reducing paper quality and limiting the number of times the paper fiber can be repulped or recycled.

Water-soluble adhesive systems which provide for complete adhesive removal from the fiber have also been proposed. Typically, commercial water-soluble products have suffered from (a) poor shelf life (the tape or label is sold in a sealed plastic bag); (b) poor humidity and/or heat-aged performance; and (c) a propensity to bleed into the paper facestock (which reduces peel performance). Each of these problems is related to the high water-sensitivity of the respective products. Such water dispersible adhesives and tapes are described, for instance, in U.S. Pat. Nos. 3,441,430 to Peterson, 3,865,770 to Blake, 4,052,368 to Larson, 4,413,080 to Blake, and 4,569,960 also to Blake, each incorporated herein by reference.

There is a need therefore to provide adhesives for a general purpose label and tape construction which are repulpable and not sensitive to changes in relative humidity and where no special precautions are required for storage or use as an adhesive for a label or tape.

SUMMARY OF THE INVENTION

According to the invention, there is provided inherently tacky water dispersible pressure-sensitive adhesives formed by emulsion polymerization and having a backbone of from about 80% to about 90% by weight of nonacid monomers, predominantly alkyl acrylates, interpolymerized with from about 10% to about 20% with a blend of acrylic acid with at least one oleophilic unsaturated carboxylic acid in the presence of a chain transfer agent. The repulpable pressure sensitive adhesives have a glass transition temperature in the range of about $-15°$ to $-50°$ C. and are formed in the presence of nonionic and anionic surfactants. Useful repulpable pressure-sensitive adhesive polymers may be prepared by one stage of polymerization, sequential polymerization or by blending separately formed polymers. Sequential emulsion polymerization is preferred. External crosslinking of the polymer can be used to enhance cohesive strength and reduce bleed into porous paper substrates. Compositions contemplated to be formed in accordance with the instant invention pass the TAPPI Useful Method 213.

The presently preferred compositions are based on a backbone of 2-ethylhexyl acrylate and butyl acrylate interpolymerized with methacrylic acid and acrylic acid in which the acid content is from about 10% to about 20% by weight of the polymer and acrylic acid comprises from about 30% to about 60% by weight of the total unsaturated carboxylic acids. The polymers are formed by sequential polymerization in which about 80% of the total monomers of high acid concentration, namely up to about 20% by weight acid, are polymerized in the presence of a nonionic and anionic surfactant. This is followed by addition of the balance of the monomers where the acid concentration is less than the acid concentration of the first monomer batch with carboxylic acid content of the second monomer batch, typically approaching 10% by weight acid. Sequential polymerization in this manner appears to provide the best balance of adhesive properties and dispersibility and humidity resistance.

Independent of how formed, it is presently preferred that the backbone comprise an interpolymerized blend of 2-ethylhexyl acrylate and butyl acrylate, methacrylic acid and acrylic acid polymerized in the presence of from about 0.5% to about 1.5% by weight of the monomers of a chain transfer agent, preferably n-dodecyl mercaptan. There may be optionally added after polymerization up to about 1% of an external crosslinker to enhance cohesive strength and reduce paper bleed. The adhesive is coated, typically to a coat weight of 20-25 g/m$^2$ and provided as a continuous coat on a label or tape stock. Such a product has the property of being re-emulsified or dispersed under the action of water, with or without agitation. The presently preferred concentrations are about 55 to about 65 percent by weight 2-ethylhexyl acrylate, about 15 to about 25 percent by weight butyl acrylate, about 10 to about 15 percent by weight methacrylic acid, and about 5 to about 10 percent by weight acrylic acid, formed in the presence of about 1% by weight of the monomers of n-dodecyl mercaptan and from about 0–5% of the weight of the monomers of aluminum acetate as the external crosslinker.

DETAILED DESCRIPTION

The present invention relates to water-dispersible inherently tacky pressure-sensitive adhesive polymers for repulpable paper label and tape applications. When employed with repulpable paper label and tape stock, the adhesives have the capability of being dispersed in water and enable recovery of paper fiber free of contamination by the adhesive.

The pressure-sensitive adhesives of the instant invention are prepared by batch (Single Stage) or sequential polymerization or by blending of batch polymers. Glass transition temperature as measured by DSC (Differential Scanning Colorimetry) of the final polymer or blend of polymers is in the range from about $-15°$ C. to $-50°$ C. Repulpability requires limiting molecular weight of the water insoluble polymer. This may be accomplished by formation of the adhesive polymer in the presence of a chain transfer agent, preferably n-dodecyl mercaptan, employed at a concentration to give a good balance of dispersibility, pressure-sensitive adhesive performance and humidity resistance.

The emulsion formed pressure-sensitive adhesives of the instant invention contain, on a percent by weight basis, up to about 90% by weight backbone monomers comprising one or more alkyl acrylates containing from 4 to about 8 carbon atoms in the alkyl group. Useful alkyl acrylates include n-butyl acrylate, 2-ethylhexyl acrylate, isooctyl acrylate, and the like. A blend of 2-ethylhexyl acrylate and butyl acrylate is preferred. It is presently preferred that the proportion of 2-ethylhexyl acrylate to butyl acrylate be about 3 to 1.

Other modifying monomers may be present so long as the glass transition temperature of the final adhesive remains in the range of from about $-15°$ C. to $-50°$ C. Representative modifying monomer include lower alkyl acrylate such as a methyl acrylate; vinyl esters, such as vinyl acetate, vinyl butyrate, vinyl propionate, vinyl isobutyrate, vinyl valerate, vinyl versitate, and the like; and diesters of dicarboxylic acid and mixtures thereof, such as di-2-ethyl hexyl maleate, di-2-ethyl hexyl fumarate, and dibutyl fumarate and the like.

The second essential component of the repulpable polymers is a blend of acrylic acid with at least one unsaturated oleophilic carboxylic acid, such as methacrylic acid and itaconic acid and the like. Blends of acrylic acid and methacrylic acid in which acrylic acid comprises from about 30% to about 60% by weight of the blend are presently preferred.

By the term "oleophilic" carboxylic acid as used herein there is meant unsaturated carboxylic acids which are more soluble in the monomeric oil phase of the emulsion than acrylic acid.

In all emulsion polymerization systems, monomers tend to homopolymerize and copolymerize. We have found that an oleophilic unsaturated carboxylic acid, such as methacrylic acid, is not only preferentially soluble in and copolymerizes with alkyl acrylates but enhances the solubility of acrylic acid in such monomers to promote copolymerization of acrylic acid with the alkyl acrylates.

In the preferred monomer system, butyl acrylate adds stiffness to the polymer backbone, methacrylic acid promotes acrylic acid copolymerization, and acrylic acid enhances adhesion to polar surfaces.

The emulsion adhesives of the instant invention are prepared in the presence of a chain transfer agent present in an amount of from about 0.5% to about 1.5% by weight of the monomers, preferably from about 0.75% to about 1.25% by weight of the monomers. The preferred chain transfer agent is n-dodecyl mercaptan or t-dodecyl mercaptan.

The repulpable emulsion polymers are prepared by providing an initial charge in the polymerization reactor of an aqueous solution containing a nonionic surfactant which is an ethoxylated rosin acid emulsifier, preferably an ethoxylated rosin acid emulsifier containing about 46 ethylene oxide groups per molecule. There is added to the initial charge in the reactor a small amount of the monomers separately prepared in a pre-emulsion containing anionic surfactant, preferably a sulfated ethoxylated nonylphenol containing about 6 ethylene oxide units per molecule and a free radical initiation system. The presently preferred nonionic surfactant is AR-150 manufactured and sold by Hercules. The presently preferred anionic surfactant is Alipal CO-436 manufactured by Rhone Poulenc. The amount of nonionic surfactant employed may be from about 4% to about 8% by weight of the initial reactor charge, with anionic surfactant concentration being from about 2.5% to about 5% by weight of the monomers in the pre-emulsion.

The reaction is redox initiated and the remaining pre-emulsified monomers are added incrementally i.e., intermittently or continuously over a period of time.

While, as previously indicated, the monomers can be added in one pre-emulsion charge, it is preferred that the monomers be sequentially added. It is presently preferred that about 80% of the total monomers, be incrimentally added to the initial charge and essentially totally reacted following by the incremental addition of the remainder of the monomers in a second pre-emulsion for reaction in the reactor. The best results have been obtained in sequential polymerization where the first charge of monomers contains a high percentage of acid, namely about 20% by weight acid, and the second charge of monomers contains a smaller amount of acid, namely about 10% by weight of acid. There is preferably provided a product containing between about 10% to about 20% by weight total carboxylic acid, of which 30% to 60% by weight of the total carboxylic acid is acrylic acid.

We have found in general that the amount of chain transfer agent employed provides a tradeoff between dispersibility, adhesive performance and humidity resistance, with the amount of chain transfer agent employed being inversely proportional to the amount of acid in the charge. It is believed the presence of high level of carboxylic acid in the polymer enhances water-dispersibility, and therefore the polymer can have a higher molecular weight. This allows a reduction in chain transfer agent. At lower carboxylic acid concentrations, the polymer is less dispersible, and therefore more chain transfer agent is required to reduce molecular weight. As molecular weight is reduced, the tendency of the polymer to bleed into a porous paper facestock is increased. This, enhances the desirability of adding to the emulsion polymers an external crosslinker, such as aluminum acetate. With the external crosslinker, crosslinking occurs after polymerization. External crosslinkers may be used in a concentration of up to about 1% by weight of the monomers, typically from about 0.4% to about 0.6% by weight of the monomers.

Polymers prepared by emulsion polymerization are described in detail herein. To be satisfactory, the polymer must pass a wash-off screening test. In this test, the adhesive is coated onto a 2 mil polyester film at a coat-weight of 20–25 g/m$^2$, dried in an oven at 70° C. for 15 minutes, cooled to room temperature, and then held under a water tap to determine if the adhesive turns milky. If so then the adhesive has the ability to be dispersed or re-emulsified or washed from a surface. This may also be established by placing a sample in a beaker of water and allowing the sample to stand to determine if the water in the beaker turns milky. A third screening test is to simply place drops of water on the adhesive surface and rub the water into the surface. If the water turns milky the adhesive is probably dispersible.

The following Examples and Controls are to illustrate the invention. In respect to Table IV, "E" means an Example representative of the invention; "C" means Control; a formulation which did not pass criteria for dispersibility; including a wash-off ("WO") screening test. The requirement for ultimate re-pulpability means passing of TAPPI UM 213: ("Tappi"). A requirement for being useful as a pressure-sensitive adhesive is passing, or at least marginally passing, a cardboard adhesion ("CA") test which is a manual looptack adhesion to recycled cardboard. In respect to Table IV "EHA" means 2-ethyl hexyl acrylate, "BA" means butyl acrylate, "MAA" means methacrylic acid, "AA" means acrylate acid, "DDM" means n-dodecyl mercaptan. "A" means single incremental addition polymerization, "S" means sequential, two stage incremental addition polymerization, and "B" means a blend of two separate "A" type polymers. With respect to an Example or Control involving sequential polymerization or a blend ("a") means the composition of the first stage pre-emulsion monomer addition or the first polymer of a blend of polymers and ("b") means the composition of the second stage of pre-emulsion monomer additional or the second polymer of a blend. AR-150 is a nonionic ethoxylated rosin acid emulsifier manufactured by Hercules and containing approximately 46 units of ethylene oxide per molecule. Alipal CO-436 is manufactured and sold by Rhone Poulenc and is a sulfonated ethoxylated non-ylphenol containing 6 units of ethylene oxide per molecule. Triton X-100 is a octylphenoxy polyethoxyethanol nonionic surfactant having a H-B value of 13.5 and Triton X-165 is a nonionic octylphenoxy polyethoxyethanol having a H-B value of 15.8 both are manufactured by Union Carbide. Vinol (now AIRVOL 703) is a polyvinyl alcohol protective colloid manufactured and sold by Air Products, Inc. In terms of performance, "F" means fail, "P" means pass, and "M" means marginal. 50# EDP means electronic data processing paper at a 50 pound per ream weight (104 Simpson paper). "WO" means wash-off in one or all combinations of three tests described above. "CA" Cardboard Looptack Adhesion by the manual test. "OB" means an overnight bleed test to determine if at 50° C., the adhesive bleeds into and produce a visible stain on 50# EDP paper. "HH" means high humidity and again a visible stain on exposure to 90% humidity, at 25° C. for one week. Pass in any bleed test means no visible stain. "Tappi" means TAPPI UM 213.

Examples 1-8 and Controls 1-5 are for compositions involving single-stage polymerization where monomers in the weight percent shown were polymerized in a single stage by addition of a pre-emulsion containing Alipal CO 436 as the surfactant in the concentration shown to a reactor containing an initial charge of water, AR-150 as the surfactant, and ferric ethylenediaminetetraceticacid and potassium persulfate in amounts shown below.

The presently preferred polymerization procedure involving sequential addition of monomers pre-emulsions and is specific for adhesive of Examples E-10 as well as general to Examples E-9 to 11 and Controls C-6 to C-9.

To a reaction vessel there was added materials shown in Table I.

TABLE I

| Component | Grams |
| --- | --- |
| WATER | 150 |
| AR-150 | 40 |
| Fe EDTA[1] | 0.1 |

[1] Fe EDTA—Ferric salt of ethylenediamine tetraaceticacid.

The mixture was heated to 70° C. treated with hydrogen peroxide for one half hour to reduce inhibition, then allowed to cool to 50° C. at which time there was added 3 grams $K_2S_2O_8$ and 9 grams of $NaHCO_3$.

There was separately formed, a pre-emulsion of the composition shown in Table II.

TABLE II

| Ingredient | % Monomers | Grams |
| --- | --- | --- |
| Water | | 255 |
| Alipal CO-436 (60%) | | 40 |
| $K_2S_2O_8$ | | 2.4 |
| 2EHA | 61 | 384 |
| BA | 20.3 | 128 |
| MAA | 12.2 | 76.8 |
| AA | 6.5 | 41.2 |
| Catalyst, tertiarybutylhydroperoxide(t-BHP) | | 7.2 |
| Chain transfer agent, n-dodecyl mercaptan (n-DDM) | | |

There is also formed a second pre-emulsion of the composition shown in Table III.

TABLE III

| Ingredient | % Monomers | Grams |
| --- | --- | --- |
| Water | | 75 |
| Alipal CO436 (60%) | | 10 |
| $K_2S_2O_8$ | | 0.6 |
| 2EHA | 58.2 | 96 |
| BA | 29.1 | 48 |
| MAA | 8.8 | 14.6 |
| AA | 3.9 | 6.4 |
| t-BHP | | 0.6 |
| n-DDM | | 1.8 |

50 grams of the first pre-emulsion was charged to the reactor at 50° C. and the balance incrementally added over a two hour period. Following completion of addition of the first pre-emulsion there was started the incremental addition of the second pre-emulsion over a one hour period. The properties of the polymer formed are shown in Example 10 of Table IV.

TABLE IV

| | % BY WGT | | | | | | % |
| --- | --- | --- | --- | --- | --- | --- | --- |
| E/C | EHA | BA | MAA | AA | DDM | MODE | POLYMER |
| E-1 | 60 | 20 | 12 | 8 | 0.50 | A | 100 |
| E-2 | 60 | 20 | 12 | 8 | 1.00 | A | 100 |
| E-3 | 60 | 20 | 12 | 8 | 1.50 | A | 100 |
| C-1 | 60 | 30 | 6 | 4 | 0.00 | A | 100 |
| C-2 | 60 | 30 | 6 | 4 | 0.25 | A | 100 |
| E-4 | 60 | 30 | 6 | 4 | 0.25 | A | 100 |
| E-5 | 60 | 30 | 6 | 4 | 0.50 | A | 100 |
| E-6 | 60 | 30 | 6 | 4 | 0.50 | A | 100 |
| E-7 | 60 | 20 | 8 | 12 | 1.50 | A | 100 |
| E-8 | 60 | 30 | 4 | 6 | 0.50 | A | 100 |
| C-3 | 60 | 30 | 6 | 4 | 0.50 | A | 100 |
| C-4 | 60 | 30 | 6 | 4 | 0.25 | A | 100 |

TABLE IV-continued

| E/C | | | | | | | | |
|---|---|---|---|---|---|---|---|---|
| C-5 | | 60 | 30 | 6 | 4 | 0.50 | A | 100 |
| E-9 | (a) | 61.0 | 20.3 | 12.2 | 6.5 | 1.14 | S | 80 |
| | (b) | 58.2 | 29.1 | 8.8 | 3.9 | 1.09 | S | 20 |
| E-10 | (a) | 61.0 | 20.3 | 12.2 | 6.5 | 0.80 | S | 80 |
| | (b) | 58.2 | 29.1 | 8.8 | 3.9 | 0.76 | S | 20 |
| C-6 | (a) | 61.0 | 20.3 | 12.2 | 6.5 | 0.57 | S | 80 |
| | (b) | 58.2 | 29.1 | 8.8 | 3.9 | 0.54 | S | 20 |
| C-7 | (a) | 61.0 | 20.3 | 12.2 | 6.5 | 1.14 | S | 80 |
| | (b) | 58.2 | 29.1 | 8.8 | 3.9 | 1.09 | S | 20 |
| E-11 | (a) | 61.0 | 20.3 | 12.2 | 6.5 | 1.14 | S | 80 |
| | (b) | 58.2 | 29.1 | 8.8 | 3.9 | 1.09 | S | 20 |
| C-8 | (a) | 61.0 | 20.3 | 12.2 | 6.5 | 0.00 | S | 80 |
| | (b) | 58.2 | 29.1 | 8.8 | 3.9 | 0.00 | S | 20 |
| C-9 | (a) | 61.0 | 20.3 | 12.2 | 6.5 | 0.00 | S | 80 |
| | (b) | 58.2 | 29.1 | 8.8 | 3.9 | 2.18 | S | 20 |
| C-10 | (a) | 60 | 20 | 12 | 8 | 1.00 | B | 50 |
| | (b) | 60 | 30 | 6 | 4 | 0.25 | B | 50 |
| E-12 | (a) | 60 | 20 | 12 | 8 | 1.00 | B | 85 |
| | (b) | 60 | 30 | 6 | 4 | 0.25 | B | 15 |
| E-13 | (a) | 60 | 20 | 12 | 8 | 1.00 | B | 90 |
| | (b) | 60 | 30 | 6 | 4 | 0.25 | B | 10 |
| E-14 | (a) | 60 | 20 | 12 | 8 | 1.00 | B | 95 |
| | (b) | 60 | 30 | 6 | 4 | 0.25 | B | 5 |

| E/C | | INITIAL SURFACTANT | % | PRE EMULSION SURFACTANT | % | TEST RESULTS | | | | |
|---|---|---|---|---|---|---|---|---|---|---|
| | | | | | | WO | CA | OB | HH | TAPPI |
| E-1 | | AR-150 | 5.00 | CO-436 | 3.75 | M | P | P | P | F |
| E-2 | | AR-150 | 5.00 | CO-436 | 3.75 | P | P | P | P/M | P |
| E-3 | | AR-150 | 5.00 | CO-436 | 2.52 | P | P | P | F | P |
| C-1 | | AR-150 | 5.00 | CO-436 | 2.75 | F | — | P | — | — |
| C-2 | | AR-150 | 7.50 | CO-436 | 2.52 | M | — | P | — | — |
| E-4 | | AR-150 | 5.00 | CO-436 | 2.52 | M | P | P | P | M |
| E-5 | | AR-150 | 7.50 | CO-436 | 3.75 | M | M | P | F | M |
| E-6 | | AR-150 | 5.00 | CO-436 | 2.52 | P | P | P | F | P |
| E-7 | | AR-150 | 5.00 | CO-436 | 3.75 | P | P | F | F | P |
| E-8 | | AR-150 | 1.25 | CO-436 | 3.50 | P | P | P | F | P |
| C-3 | | Vinol | 7.50 | CO-436 | 2.25 | F | — | — | — | — |
| C-4 | | Vinol | 10.00 | CO-436 | 3.00 | M | — | F | — | — |
| C-5 | | Vinol | 10.00 | CO-436 | 3.00 | M | — | F | — | — |
| E-9 | (a) | AR-150 | 5.00 | CO-436 | 3.80 | P | P | P | F | P |
| | (b) | AR-150 | 5.00 | CO-436 | 3.60 | | | | | |
| E-10 | (a) | AR-150 | 5.00 | CO-436 | 2.66 | P | P | P | M | P |
| | (b) | AR-150 | 5.00 | CO-436 | 2.52 | | | | | |
| C-6 | (a) | AR-150 | 5.00 | CO-436 | 1.90 | M | P | P | M+ | F |
| | (b) | AR-150 | 5.00 | CO-436 | 1.80 | | | | | |
| C-7 | (a) | Triton X165 | 5.00 | CO-436 | 3.80 | M | M | — | M | — |
| | (b) | Triton X165 | 5.00 | CO-436 | 3.60 | | | | | |
| E-11 | (a) | Triton X165 | 5.00 | CO-436 | 3.80 | P | M | — | M | — |
| | (b) | Triton X165 | 5.00 | CO-436 | 3.60 | | | | | |
| C-8 | (a) | None | 0.00 | CO-436 | 3.80 | F | — | — | — | — |
| | (b) | None | 0.00 | CO-436 | 3.60 | | | | | |
| C-9 | (a) | None | 0.00 | CO-436 | 3.80 | F | — | — | — | — |
| | (b) | None | 0.00 | CO-436 | 3.60 | | | | | |
| C-10 | (a) | AR-150 | 5.00 | CO-436 | 3.75 | — | P | P | P | F |
| | (b) | AR-150 | 7.50 | CO-436 | 2.52 | | | | | |
| E-12 | (a) | AR-150 | 5.00 | CO-436 | 3.75 | — | M | P | P | P |
| | (b) | AR-150 | 7.50 | CO-436 | 2.52 | | | | | |
| E-13 | (a) | AR-150 | 5.00 | CO-436 | 3.75 | — | M | P | F | P |
| | (b) | AR-150 | 7.50 | CO-436 | 2.52 | | | | | |
| E-14 | (a) | AR-150 | 5.00 | CO-436 | 3.75 | — | M | P | F | P |
| | (b) | AR-150 | 7.50 | CO-436 | 2.52 | | | | | |

The chain transfer agent level is also used to ensure repulpability while maintaining adhesive performance. An excess of the amount of chain transfer agent results in polymers with poor adhesive properties. Too little chain transfer agent results in an inability to repulp the adhesive polymer. Increasing the amount of chain transfer agent reduces the polymer molecular weight and conversly decreasing the amount of chain transfer agent increases the polymer molecular weight. One could also increase or decrease polymer molecular weight by other means such as changing polymerization temperature to achieve adequate dispersibility.

On the average, the amount of n-dodecyl mercaptan found to be most functional is about 1%±0.5% by weight based on the total weight of the monomers.

For Examples E-12 to E-14 and Control 10 blends of polymers were used, each polymer being polymerized in a manner used for individual polymerization. The individual polymers were blended in a proportion of 50 to 95% (a) polymer and 50 to 5% (b) polymer. As indicated by Table IV the presence of dodecyl mercaptan at about 0.5% for a single batch polymerization was marginal as to utility of the product and at 1.5% marginal with respect to utility as to bleed. To our surprise, however, two stage sequential monomers addition provided a more aggressive adhesive than a blend of polymers and allowed a reduction of n-dodecyl mercaptan to achieve the same overall adhesive performance.

In respect to the compositions of the instant invention, some paper mills regard the Tappi test as too stringent and compositions which may fail the Tappi test may still be regarded as repulpable adhesive provided they do not accumulate in the recovered paper fiber pulp.

During the course of our work, we found the acrylic emulsion adhesives of greater than 20% total acid were water dispersion but not inherently tacky. However, through the addition of known plasticizing and tackifying agents adhesion (looptack peel on cardboard) can be improved. These adhesives were not humidity tolerant, however and bled onto 50 #EDP facestock.

At acid levels below 10%, the adhesives were inherently more tacky and showed good humidity performance i.e. no bleed under identical storage conditions. However, these systems were not repulpable by Tappi UM 213 methodology.

Blending the polymers at rations of (MAA/AA 20% and 10%) at polymer ratios of 80:20 to 95:5 gave products that marginally passed Tappi UM 213 with improved looptack adhesion to cardboard and improved bleed performance under high humidity exposure.

Surprisingly, externally crosslinking the blended formulations with $Al(OH)_2Ac \cdot \frac{1}{3}H_3BO_3$ greatly improved repulpability. Even marginally repulpable systems (like the 80:20 blend) become fully water dispersible when cross-linked.

We found that adhesive polymers formed by sequential polymerization were inherently more tacky than uncrosslinked and crosslinked polymers of the same monomer composition prepared individually or blended.

By increasing base weight of the repulpable paper to 60 pounds per ream or using coated repulpable paper such as 55 pound per ream paper stock such as 110 paper by Midtek, bleed is reduced and more adhesion retained on exposure to high humidity.

What is claimed is:

1. A water dispersible, inherently tacky pressure-sensitive adhesive comprising a tacky emulsion polymer formed from about 80 to 90% by weight of first monomers comprising a major portion of at least one alkyl acrylate containing from 4 to about 8 carbon atoms in the alkyl group and from about 20 to 10% by weight of second monomers which are of a mixture of acrylic acid with at least one oleophilic unsaturated carboxylic acid, said emulsion polymer having a glass transition temperature of from abbot $-15°$ to about $-50°$ C. and formed in the presence of anionic and nonionic surfactants and a sufficient amount of chain transfer agent to provide a polymer which when coated onto a repulpable paper substrate is sufficiently dispersible to enable recovery of paper fibers substantially free of adhesive under conditions of TAPPI Useful Method 213, said adhesive under resistant to loss of adhesive properties on exposure to high humidity.

2. A pressure sensitive adhesive as claimed in claim 1 in which the first monomers are a mixture of a first acrylate selected from the group consisting of 2-ethylhexyl acrylate, isooctyl acrylate and mixtures thereof with butyl acrylate.

3. A pressure-sensitive adhesive as claimed in claim 2 in which the weight ratio of first acrylate to butyl acrylate is about 3 to 1.

4. A pressure-sensitive adhesive as claimed in claim 1 in which the second monomers are a mixture of acrylic acid and methacrylic acid in which the acrylic acid is present in an amount of from about 30 to 60 percent by weight of the mixture.

5. A pressure-sensitive adhesives as claimed in claim 2 in which the second monomers are a mixture of acrylic acid and methacrylic acid in which the acrylic acid is present in an amount of from about 30 to about 60 percent by weight of the mixture.

6. A pressure-sensitive adhesive as claimed in claim 3 in which the second monomers are a mixture of acrylic acid and methacrylic acid in which the acrylic acid is present in an amount of from about 30 to 60 percent by weight of the mixture.

7. A pressure-sensitive adhesive as claimed in claim 1 in which the nonionic surfactant is an ethoxylated rosin acid.

8. A pressure-sensitive adhesive as claimed in claim 1 in which the anionic surfactant is a sulfated ethoxylated nonyl phenol.

9. A pressure-sensitive adhesive as claimed in claim 7 in which the anionic surfactant is a sulfated ethoxylated nonyl phenol.

10. A pressure-sensitive adhesive as claimed in claim 1 in which the chain transfer agent is dodecyl mercaptan present in an amount of from 0.5 to about 1.5 percent by weight based on the total weight of the monomers.

11. A pressure-sensitive adhesive as claimed in claim 7 in which the chain transfer agent is dodecyl mercaptan present in an amount of from 0.5 to about 1.5 percent by weight based on the total weight of the monomers.

12. A pressure-sensitive adhesive as claimed in claim 9 in which the chain transfer agent is dodecyl mercaptan present in an amount of from 0.5 to about 1.5 percent by weight based on the total weight of the monomers.

13. A pressure-sensitive adhesive as claimed in claim 1 in which the polymer is formed by sequential polymerization in an aqueous medium containing the nonionic surfactant of a first monomer pre-emulsion containing about 80% of the total monomers and about 20 percent by weight of the mixture of acrylic acid and the oleophilic unsaturated carboxylic acid, followed by addition of a second monomer pre-emulsion containing the balance of the monomers and about 10 percent by weight of the mixture of acrylic acid and the oleophilic unsaturated carboxylic acid and anionic emulsifier.

14. A pressure-sensitive adhesive as claimed in claim 12 in which the polymer is formed sequential polymerization in an aqueous medium containing the nonionic surfactant of a first monomer pre-emulsion containing about 80% of the total monomers and about 20 percent by weight of the mixture of acrylic acid and the oleophilic unsaturated carboxylic acid, followed by addition of a second monomer pre-emulsion containing the balance of the monomers and about 10 percent by weight of the mixture of acrylic acid and the oleophilic unsaturated carboxylic acid and anionic emulsifier.

15. A water dispersible, inherently tacky pressure-sensitive adhesive comprising tacky emulsion polymers formed from about 80 to 90% by weight of a mixture of a first alkyl acrylate selected from the group consisting of isooctyl acrylate, 2-ethylhexyl acrylate and mixtures thereof with butyl acrylate and from about 20 to 10% by weight of a mixture of acrylic acid and methacrylic acid in which acrylic acid comprises about 30 to 60% by weight of the mixture of acrylic acid and methacrylic acid, said emulsion polymer having a glass transition temperature of about $-15°$ to about $-50°$ C. and formed in the presence of a sulfonated ethoxylated nonyl phenol anionic surfactant and an ethoxylated rosin acid nonionic surfactant and from about 0.5 about 1.5 percent by weight of the monomers of chain transfer agent to provide a polymer which when coated on a repulpable paper substrate is sufficiently dispersible to enable recovery of paper fibers substantially free of adhesive under conditions of TAPPI Useful Method 213, said adhesive being resistant to loss of adhesive properties on exposure to high humidity.

16. A pressure-sensitive adhesive as claimed in claim 15 in which the proportion of the first alkyl acrylate to butyl acrylate is about 3 to 1.

17. A pressure-sensitive adhesive as claimed in claim 15 in which the adhesive is formed of a blend of polymers.

18. A pressure-sensitive adhesive as claimed in claim 15 in which the pressure-sensitive adhesive is prepared by sequential polymerization of a pre-emulsion of about 80 percent of the monomer containing about 20 percent by weight of the mixture of acrylic acid and methacrylic acid and the anionic surfactant added to an aqueous charge containing the nonionic surfactant followed by addition of a pre-emulsion of about 20 percent of the monomers containing about 10 percent by weight of the mixture of acrylic acid and methacrylic acid in an aqueous solution containing the anionic surfactant.

19. A pressure-sensitive adhesive as claimed in claim 15 in which the adhesive polymer contains about 55 to about 65 percent by weight 2-ethylhexyl acrylate, about 15 to about 25 percent by weight butyl acrylate, about 10 to about 15 percent by weight methacrylic acid and about 5 to about 8 percent by weight acrylic acid.

20. A pressure-sensitive adhesive as claimed in claim 18 in which the adhesive polymer contains about 55 to about 65 percent by weight 2-ethylhexyl acrylate, about 15 to about 25 percent by weight butyl acrylate, about 10 to about 15 percent by weight methacrylic acid and about 5 to about 10 percent by weight acrylic acid.

* * * * *

UNITED STATES PATENT AND TRADEMARK OFFICE
CERTIFICATE OF CORRECTION

PATENT NO. : 5,196,504
DATED : March 23, 1993
INVENTOR(S) : William F. Scholz; Robert H. Van Ham It is certified that error appears in the above-identified patent and that said Letters Patent is hereby corrected as shown below:

Column 4, line 10, change "incrimentally" to -- incrementally --.
Column 4, line 16, change "incrimentally" to -- incrementally --.

Column 5, lines 27,28,30, change "a" to -- an -- (all occurrences).
Column 5, line 35, change "50# EDP" to -- 50 #EDP --.
Column 5, line 39, before "by" insert -- is --.
Column 5, line 41, change "produce" to -- produces --.
Column 5, line 41, change "50# EDP" to -- 50 #EDP --.

Column 6, line 2, after "monomers" insert a comma.

Column 7, line 61, change "conversly" to -- conversely --.

Column 9, line 7, change "dispersion" to -- dispersible --.
Column 9, line 17, change "rations" to -- ratios --.

UNITED STATES PATENT AND TRADEMARK OFFICE
CERTIFICATE OF CORRECTION

PATENT NO. : 5,196,504

DATED : March 23, 1993

INVENTOR(S) : William F. Scholz; Robert H. Van Ham

It is certified that error appears in the above-identified patent and that said Letters Patent is hereby corrected as shown below:

Column 9, line 47, change "abbot" to -- about --.

Column 10, line 47, before "sequential" insert -- by --.

Column 11, line 2, before "about" (second occurrence) insert --to--.

Signed and Sealed this

Fifteenth Day of March, 1994

BRUCE LEHMAN

*Attest:*

*Attesting Officer*     Commissioner of Patents and Trademarks